US008063909B2

(12) United States Patent
Boland et al.

(10) Patent No.: US 8,063,909 B2
(45) Date of Patent: *Nov. 22, 2011

(54) SYSTEMS AND METHODS FOR PROVIDING INTERMEDIATE TARGETS IN A GRAPHICS SYSTEM

(75) Inventors: Michele B Boland, Seattle, WA (US); Charles N Boyd, Woodinville, WA (US); Anantha R Kancherla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/489,316

(22) Filed: Jun. 22, 2009

(65) Prior Publication Data
US 2009/0256849 A1 Oct. 15, 2009

Related U.S. Application Data

(63) Continuation of application No. 10/196,864, filed on Jul. 16, 2002, now Pat. No. 7,564,460.

(51) Int. Cl.
*G06T 1/00* (2006.01)

(52) U.S. Cl. ........ 345/522; 345/426; 345/543; 345/505; 712/1; 717/120; 717/131

(58) Field of Classification Search ................ None
See application file for complete search history.

(56) References Cited

U.S. PATENT DOCUMENTS

| | | | |
|---|---|---|---|
| 5,422,657 A | 6/1995 | Wang et al. | |
| 5,481,669 A | 1/1996 | Poulton et al. | |
| 5,793,374 A | 8/1998 | Guenter et al. | |
| 5,905,502 A | 5/1999 | Deering | |
| 6,862,730 B1 | 3/2005 | Gorti et al. | |
| 7,564,460 B2 * | 7/2009 | Boland et al. | 345/505 |
| 2003/0020741 A1 | 1/2003 | Boland et al. | |

FOREIGN PATENT DOCUMENTS

| | | |
|---|---|---|
| EP | 1182618 | 2/2002 |
| EP | 1383080 A1 | 1/2004 |
| JP | 2001204960 A * | 7/2001 |

(Continued)

OTHER PUBLICATIONS

[Translation] Official Letter of Pending Patent Application Under Examination & Search Report, Aug. 28, 2007, 15 pages. [ cites reference # TW219129 ].
The Canadian Office Action mailed on Jan. 12, 2011 for Canandian Application No. 2,424,650, a counterpart foreign application of US Patent No. 7,564,460.

(Continued)

*Primary Examiner* — Antonio Caschera
(74) *Attorney, Agent, or Firm* — Lee & Hayes, PLLC (57) ABSTRACT

Intermediate target(s) are utilized in connection with computer graphics in a computer system. In various embodiments, intermediate memory buffers in video memory are utilized to allow serialized programs from graphics APIs to support algorithms that exceed the instruction limits of procedural shaders for single programs. The intermediate buffers may also allow sharing of data between programs for other purposes as well, and are atomically accessible. The size of the buffers, i.e., the amount of data stored in the intermediate targets, can be variably set for a varying amount of resolution with respect to the graphics data. In this regard, a single program generates intermediate data, which can then be used, and re-used, by an extension of the same program and/or any number of other programs any number of times, enabling considerable flexibility and complexity of shading programs, while maintaining the speed of modern graphics chips.

13 Claims, 8 Drawing Sheets

FOREIGN PATENT DOCUMENTS

| | | |
|---|---|---|
| TW | 219989 | 1/1994 |
| TW | 299406 | 3/1997 |
| TW | 444183 B | 7/2001 |
| WO | WO9952093 A1 * | 10/1999 |

OTHER PUBLICATIONS

The European Office Action mailed Feb. 24, 2011 for European Patent Application No. 03007908.1, a counterpart foreign application of US Patent No. 7,564,460.

* cited by examiner

SYSTEMS AND METHODS FOR PROVIDING INTERMEDIATE TARGETS IN A GRAPHICS SYSTEM

RELATED APPLICATION

This application is a continuation of and claims priority to U.S. patent application Ser. No. 10/196,864, filed on Jul. 16, 2002, the disclosure of which is incorporated by reference herein.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2002, Microsoft Corp.

FIELD OF THE INVENTION

The present invention is directed to systems and methods for providing intermediate memory target(s) in connection with computer graphics. More particularly, the present invention is related to systems and methods for providing intermediate memory target(s) for use in connection with procedural shaders, such as pixel and vertex shaders.

BACKGROUND OF THE INVENTION

Rendering and displaying three dimensional (3-D) graphics typically involves many calculations and computations. For example, to render a 3-D object, a set of coordinate points or vertices that define the object to be rendered are formed. Vertices can be joined to form polygons that define the surface of the object to be rendered and displayed. Once the vertices that define an object are formed, the vertices can be transformed from an object or model frame of reference to a world frame of reference and finally to 2-D coordinates that can be displayed on a flat display device, such as a monitor. Along the way, vertices may be rotated, scaled, eliminated or clipped because they fall outside of a viewable area, lit by various lighting schemes and sources, colorized, otherwise transformed, shaded and so forth. The processes involved in rendering and displaying a 3-D object can be computationally intensive and may involve a large number of vertices.

Figure 1:
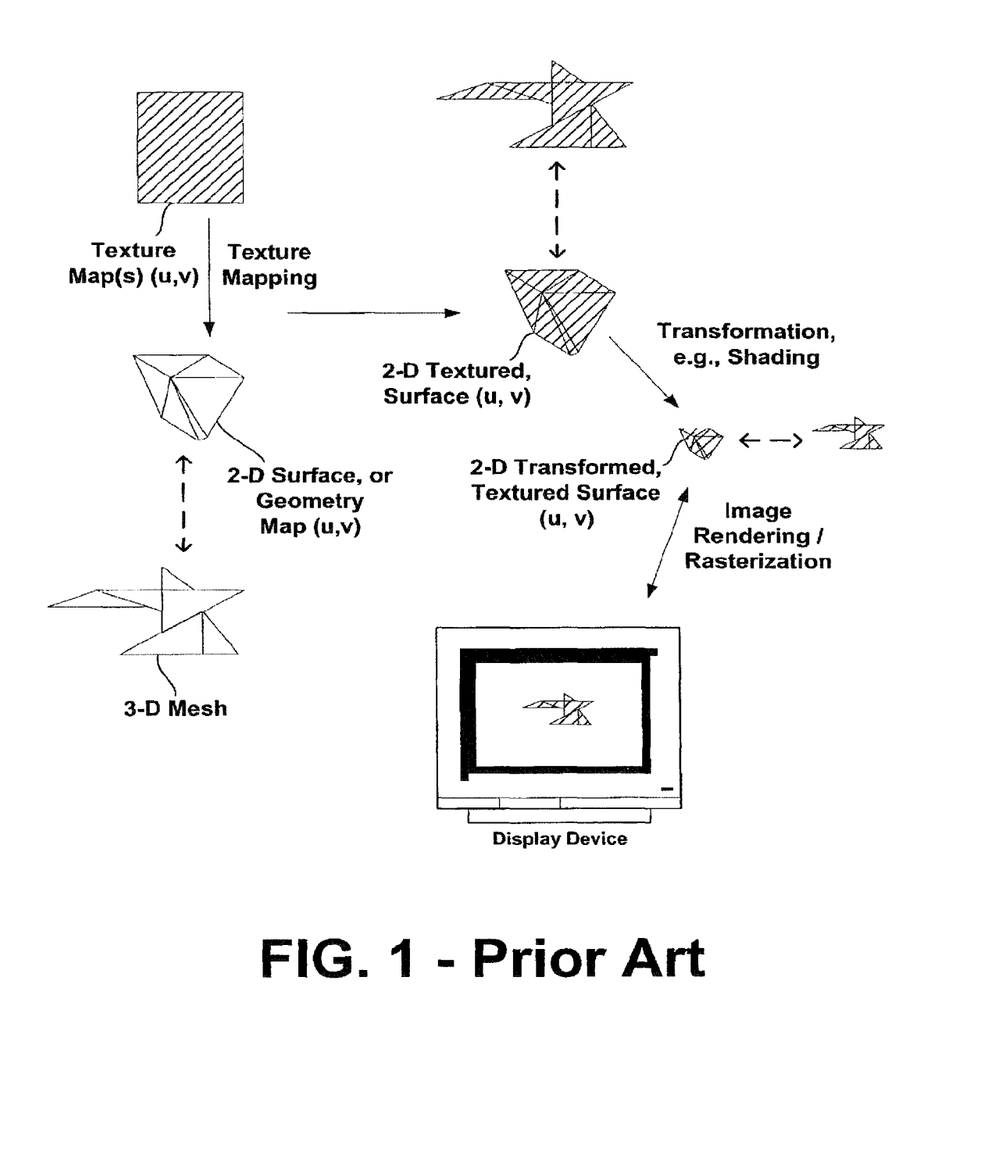
FIG. 1 provides an overview of the process of a graphics pipeline in a computer graphics system.

Conventionally, as illustrated in FIG. 1, complex 3-D objects, or portions thereof, can be represented by collections of adjacent triangles ("a mesh") representing the approximate geometry of the 3-D object, or by a geometry map, or surface, in two dimensional (2-D) surface space. The mesh can be specified through the position of the vertices of the triangles. One or more texture maps can be mapped to the surface to create a textured surface according to a 5 texture mapping process. In this regard, signals textured over a surface can be very general, and can specify any sort of intermediate result that can be input to transformation mechanism(s), such as shader procedure(s), to produce a final color and/or other values associated with a point sample.

After texture sampling, additional transformations, such as shading algorithms and 10 techniques, can optionally be applied to the textured surface prior to rendering the image with picture elements (pixels) of a display device, or outputting the data to somewhere else for some purpose other than display. Images in computer graphics are typically represented as a 2-D array of discrete values (grey scale) or as three 2-D arrays of discrete values (color). Using a standard (x, y, z) rectangular coordinate system, a surface can be specified as a mesh (e.g., triangle mesh) with an (x,y,z) coordinate per mesh vertex, or as a geometry map in which the (x,y,z) coordinates are specified as a rectilinear image over a 2D (u,v) coordinate system, sometimes termed the surface parameterization domain. Texture map(s) can also be specified with the (u, v) coordinate system.

Point samples in the surface parameterization domain, where signals have been attached to the surface, including its geometry, can be generated from textured meshes or geometry maps.

These samples can be transformed and shaded using a variety of computations. At the end of this transformation and shading processing, a point sample includes (a) positional information, i.e., an image address indicating where in the image plane the point maps to and (b) textured color, or grey scale, information that indicates the color of the sample at the position indicated by the positional information. Other data, such as depth information of the point sample to allow hidden surface elimination, weight, or any other useful information about the point sample can also be included. The transformed, textured surface is placed in a frame buffer prior to being rendered by a display in 2-D pixel image space (x, y). At this point, in the case of a black and white display device, each (x, y) pixel location in 2-D image space is assigned a grey value in accordance with some function of the surface in the frame buffer. In the case of a typical color display device, each (x, y) pixel location in 2-D image space is assigned red, green and blue (RGB) values. It is noted that a variety of color formats other than RGB exist as well. While variations of the architecture, from start to finish, the above-described vehicle for the crunching of massive amounts of graphics vertex and pixel data is known as the graphics pipeline.

The computer graphics industry and graphics pipelines have seen a particularly tremendous amount of growth in the last few years. For example, current generations of computer games are moving to three dimensional (3-D) graphics in an ever increasing and more realistic fashion. At the same time, the speed of play is driven faster and faster. This combination has fueled a genuine need for the rapid rendering of 3-D graphics in relatively inexpensive systems.

As early as the 1970s, 3-D rendering systems were able to describe the "appearance" of objects according to parameters. These and later methods provide for the parameterization of the perceived color of an object based on the position and orientation of its surface and the light sources illuminating it. In so doing, the appearance of the object is calculated therefrom.

Parameters further include values such as diffuse color, the specular reflection coefficient, the specular color, the reflectivity, and the transparency of the material of the object. Such parameters are globally referred to as the shading parameters of the object.

Early systems could only ascribe a single value to shading parameters and hence they remained constant and uniform across the entire surface of the object. Later systems allowed for the use of non-uniform parameters (transparency for instance) that might have different values over different parts of the object. Two prominent and distinct techniques have been used to describe the values taken by these non-uniform parameters on the various parts of the object's surface: procedural shading and texture mapping. Texture mapping is pixel based and resolution dependent.

Procedural shading describes the appearance of a material at any point of a 1-D, 2-D or 3-D space by defining a function (often called the procedural shader) in this space into shading parameter space. The object is "immersed" in the original 1-D, 2-D or 3-D space and the values of the shading parameters at a given point of the surface of the object are defined as a result of the procedural shading function at this point. For instance, procedural shaders that approximate appearance of wood, marble or other natural materials have been developed and can be found in the literature.

The rendering of graphics data in a computer system is a collection of resource intensive processes. The process of shading, i.e., the process of performing complex algorithms upon set(s) of specialized graphics data structures, used to determine values for certain primitives, such as color, etc. associated with the graphics data structures, exemplifies such a computation intensive and complex process. Generally the process of shading has been normalized to some degree. By passing source code designed to work with a shader into an application, a shader becomes an object that the application may create/utilize in order to facilitate the efficient drawing of complex video graphics. Vertex shaders and pixel shaders are examples of such shaders.

Prior to their current implementation in specialized hardware chips, vertex and pixel shaders were sometimes implemented wholly or mostly as software code, and sometimes implemented as a combination of more rigid pieces of hardware with software for controlling the hardware. These implementations frequently contained a CPU or emulated the existence of one using the system's CPU. For example, the hardware implementations directly integrated a CPU chip into their design to perform the processing functionality required of shading tasks. While a CPU adds a lot of flexibility to the shading process because of the range of functionality that a standard processing chip offers, the incorporation of a CPU adds overhead to the specialized shading process. Without today's hardware state of the art, however, there was little choice.

Today, though, existing advances in hardware technology have facilitated the ability to move functionality previously implemented in software into specialized hardware. As a result, today's pixel and vertex shaders are implemented as specialized and programmable hardware chips. Today's hardware designs of vertex and pixel shader chips are highly specialized and thus do not behave like CPU hardware implementations of the past.

Specialized 3-D graphics APIs have been developed that expose the specialized functionality of today's vertex and pixel shaders. In this regard, a developer is able to download instructions to a vertex shader that effectively program the vertex shader to perform specialized behavior. For instance, APIs expose functionality associated with increased numbers of registers in vertex shaders, e.g., specialized vertex shading functionality with respect to floating point numbers at a register level. In addition, it is possible to implement an instruction set that causes the extremely fast vertex shader to return only the fractional portion of floating point numbers. A variety of functionality can be achieved through downloading these instructions, assuming the instruction count limit of the vertex shader is not exceeded.

Similarly, with respect to pixel shaders, specialized pixel shading functionality can be achieved by downloading instructions to the pixel shader. For instance, functionality is exposed that provides a linear interpolation mechanism in the pixel shader. Furthermore, the functionality of many different operation modifiers are exposed to developers in connection with instruction sets tailored to pixel shaders. For example, negating, remapping, biasing, and other functionality are extremely useful for many graphics applications for which efficient pixel shading is desirable, yet as they are executed as part of a single instruction they are best expressed as modifiers to that instruction. In short, the above functionality is advantageous for a lot of graphics operations, and their functional incorporation into already specialized pixel and vertex shader sets of instructions adds tremendous value from the perspective of ease of development and improved performance. A variety of functionality can thus be achieved through downloading these instructions, assuming the instruction count limit of the pixel shader is not exceeded.

Commonly assigned copending U.S. patent application Ser. No. 09/801,079, filed Mar. 6, 2001, provides such exemplary three-dimensional (3-D) APIs for communicating with hardware implementations of vertex shaders and pixel shaders having local registers. With respect to vertex shaders, API communications are described therein that may make use of an on-chip register index and API communications are also provided for a specialized function, implemented on-chip at a register level, which outputs the fractional portion(s) of input(s). With respect to pixel shaders, API communications are provided for a specialized function, implemented on-chip at a register level, that performs a linear interpolation function and API communications are provided for specialized modifiers, also implemented on-chip at a register level, that perform modification functions including negating, complementing, remapping, biasing, scaling and saturating. Advantageously, the API communications expose very useful on-chip graphical algorithmic elements to a developer while hiding the details of the operation of the vertex shader and pixel shader chips from the developer.

Commonly assigned copending U.S. patent application Ser. No. 09/796,577, filed Mar. 1, 2001, also describes 3-D APIs, which expose unique algorithmic elements to developers for use with procedural shaders via a mechanism that is conceptually below or inside the software interface, and enable a developer to download instructions to the procedural shaders, and GPU. For instance, such a 3-D API enables operations to be downloadable to a 3-D chip for improved performance characteristics. These 3-D APIs take advantage of cutting edge 3-D graphics chips that have begun to handle such programmable functionality, by including flexible on chip processing and limited on chip memory, to remove custom graphics code from the processing of the host processor and to place such programmable and downloadable functionality in a graphics chip. Such APIs make it so that programming or algorithmic elements written by the developer can be downloaded to the chip, thereby programming the chip to perform those algorithms at improved performance levels. Related to this case where a developer may write a routine downloadable to the 3-D chip, there are also set(s) of algorithmic elements that are provided in connection with the 3-D API (routines that are not written by the developer, but which have already been programmed for the developer).

Similarly, a developer can download these pre-packaged API algorithms to a programmable 3-D chip for improved performance. The ability to download 3-D algorithmic elements provides improved performance, greater control as well as development ease. Thus, the introduction of programmable operations on a per vertex and per pixel basis has become more wide spread in modern graphics hardware. This general programmability allows a vast potential for sophisticated creative algorithms at increased performance levels. However, there are some limitations to what can be achieved. Typically, with present day rendering pipelines at the vertex and pixel shaders, as illustrated in FIG. 2A, a stream of geometry data SGD is input to the vertex shader 200 to perform some operation of the vertices, after which a rasterizer 210 rasterizes the geometry data to pixel data, outputting a stream of pixel data SPD1.

The vertex shader 200 may receive instructions which program the vertex shader 200 to perform specialized functionality, but there are limits to the size and complexity of the vertex shader instructions. Similarly, a pixel shader 220 can optionally perform one or more transformations to the data outputting a stream of pixel data SPD2. The pixel shader 220 may also receive instructions which program the pixel shader 220 to perform specialized functionality, but there are limits to the size and complexity to the pixel shader instructions. Thus, one limit to today's APIs and corresponding hardware is that most hardware has a very limited instruction count. This limited instruction count prevents implementation of some of the most sophisticated algorithms by the developer using the APIs. Additionally, the current programmable hardware has very limited mechanisms to exchange data between separate programs, i.e., a first pixel shader program cannot re-use data output from a second pixel shader program.

Figure 2A:
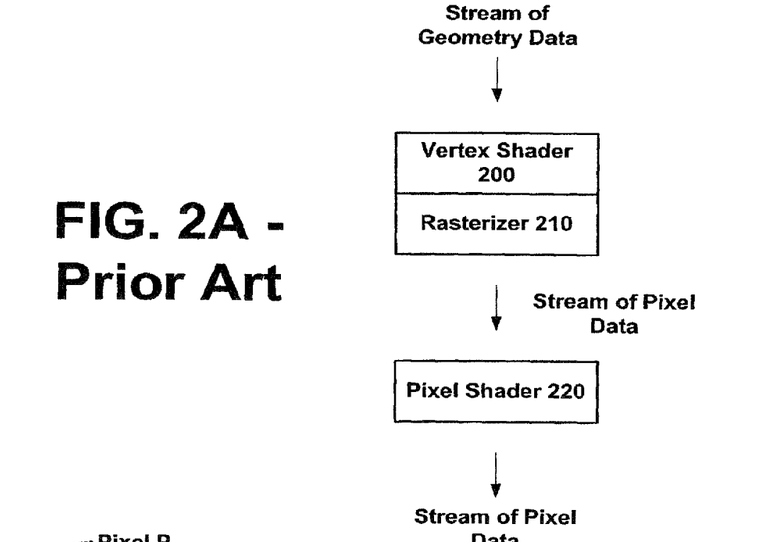
FIGS. 2A to 2C illustrate various limitations of and problems with prior art graphics pipelines.
Figure 2B:
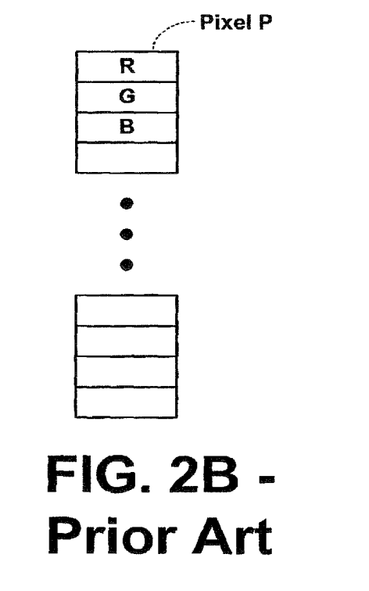
Figure 2C:
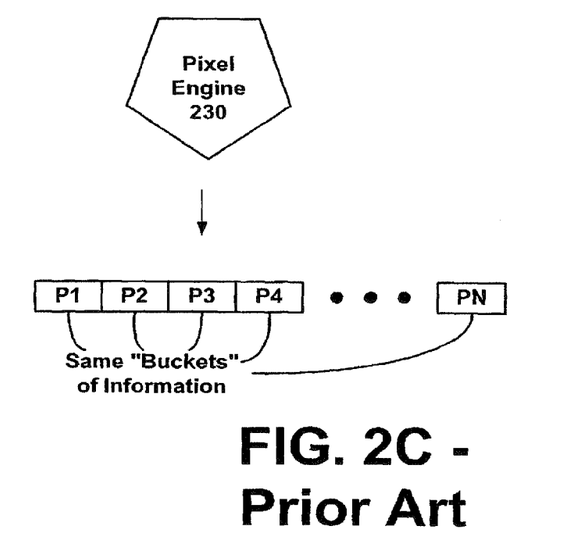

Additionally, as illustrated in FIG. 2A, a pixel is commonly thought of as a point in the 2-D grid of image space, having a grey scale value or color values associated therewith; however, modern graphics regards a pixel in the pixel engine pipeline as any collective data associated with a point in any 2-D array, whether it be relevant to a displayed image or not. For instance, while FIG. 2A illustrates a pixel having a bucket for Red, a bucket for Green and a bucket for Blue, this need not be the case, and any number of buckets and corresponding values can be a pixel. Thus, there is considerable flexibility in generating a 2-D array of pixel data, which could include parameter values for lighting effects, weight, z-buffer information, etc. A problem with today's graphics pipeline, as illustrated in FIG. 2C, relates to the flexibility with which separate sets of pixels can be output. While pixel engine 230 is capable of outputting any kind of pixel data, i.e., the pixels P1, P2, P3, P4 to PN being streamed as output can take on considerable flexibility as to the kind and number of buckets defining the pixels, P1, P2, P3, P4 to PN, P1, P2, P3, P4 to PN nonetheless all have to have the same buckets. Thus, if P1 includes R, G, B data, so do P2, P3, P4 to PN, and thus there isn't the flexibility to define different sets of output pixel data, some of which might be used for lighting and some might be used strictly for color.

Moreover, currently, resolution for render targets is predetermined in accordance with the rasterization process, i.e., the rendering process drives the amount of samples that can be placed in a render target, and it would thus be desirable to variably control the resolution of a render target, i.e., the amount of samples that can be stored in connection with a render target It would thus be desirable to implement systems and methods that overcome the shortcomings of present programmability in connection with present graphics pipelines architectures, APIs and hardware due to limitations in instruction count, limitations in form of output and the lack of sharing of data between programs.

SUMMARY OF THE INVENTION

In view of the foregoing, the present invention provides systems and methods for providing intermediate target(s) in connection with computer graphics in a computer system. In various embodiments, the invention provides and utilizes intermediate memory buffers in video memory to allow serialized programs from graphics APIs to support algorithms that exceed the instruction limits of procedural shaders for single programs. The intermediate buffers may also allow sharing of data between programs for other purposes as well, and are atomically accessible.

The size of the buffers, i.e., the amount of data stored in the intermediate targets, can be variably set for a varying amount of resolution with respect to the graphics data. In this regard, a single program generates intermediate data, which can then be used, and re-used, by an extension of the same program and/or any number of other programs any number of times as may be desired, enabling considerable flexibility and complexity of shading programs, while maintaining the speed of modern graphics chips.

Other features and embodiments of the present invention are described below.

BRIEF DESCRIPTION OF THE DRAWINGS

The system and methods for providing intermediate memory targets in accordance with the present invention are further described with reference to the accompanying drawings in which.

DETAILED DESCRIPTION OF THE INVENTION

Overview

As described above, the present invention enables multiple intermediate target circulation for use in shading languages, such as low level shading languages, which enable a developer to program the functionality of procedural shaders. Graphics platforms that do not have the recirculation of intermediate targets in accordance with the invention are limited in the size and complexity of programs that operate on a per pixel and per vertex level. The systems and methods of the invention enable the creation of a high level language to abstract and simplify use of the programmable capabilities in connection with the evolution of a generally programmable graphics pipeline. The invention can also be used to create virtually unlimited length programs that allow non-real time rendering using hardware acceleration. The size of the buffers, i.e., the amount of data stored in the intermediate targets, can be variably set for a varying amount of resolution with respect to the graphics data. The availability of unlimited hardware accelerated recirculation for non-real time rendering applications in accordance with the invention thus increases the speed and performance of a graphics platform.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with the intermediate memory targets of the invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services. Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate the intermediate memory targets of the invention.

Figure 3A:
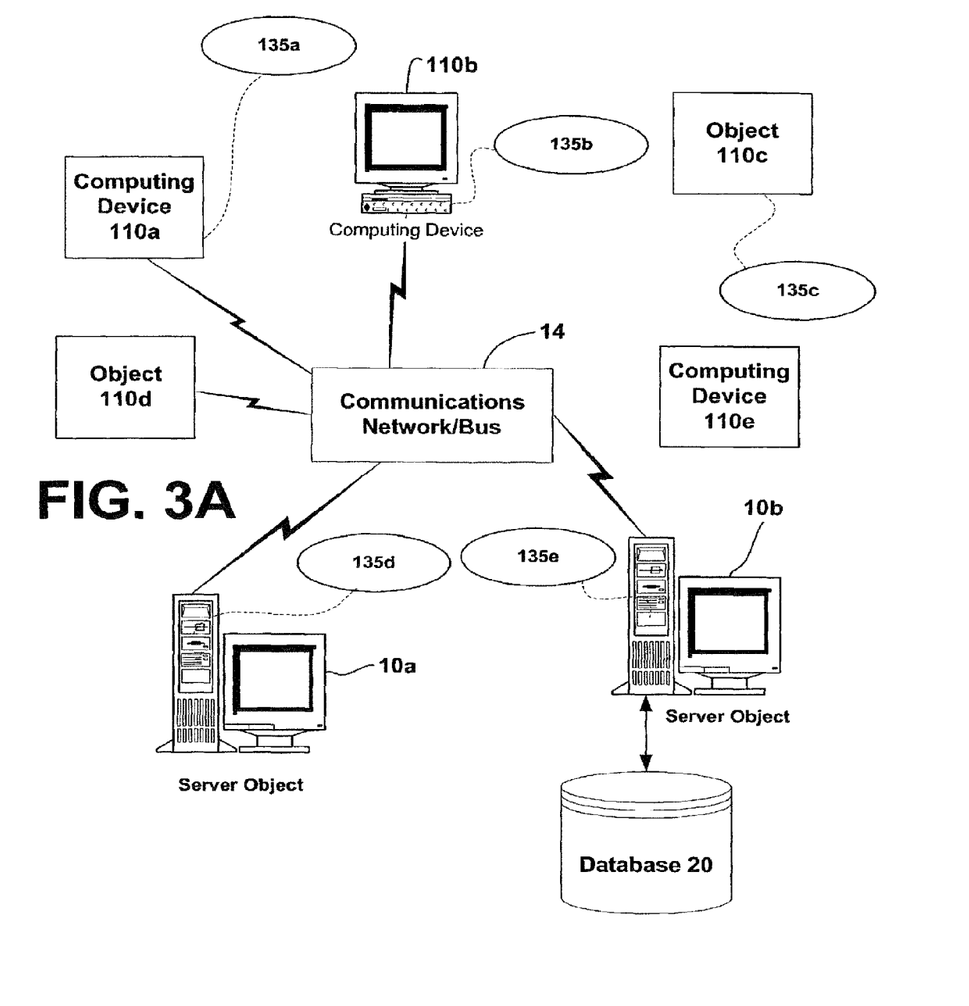
FIG. 3A is a block diagram representing an exemplary network environment having a variety of computing devices in which the present invention may be implemented.

FIG. 3A provides a schematic diagram of an exemplary networked or distributed computing environment. The distributed computing environment comprises computing objects 110c, 111d, etc. and computing devices 110a, 110b, 110e, 10a, 10b, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 3A. In accordance with an aspect of the invention, each object 110c, 110d, etc. or 110a, 110b, 110e, etc. may contain an application that might make use of an API, or other object, to request use of the intermediate memory targets of the invention.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. Services that use the intermediate targets in accordance with the present invention may thus be distributed among clients and servers, acting in a way that is efficient for the entire network. Distributed computing can help businesses deliver services and capabilities more efficiently across diverse geographic boundaries. Moreover, distributed computing can move data closer to the point where data is consumed acting as a network caching mechanism.

Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since graphical object(s), texture maps, shading data, etc. may in practice be physically located in one or more locations; the ability to distribute services that make use of the intermediate targets described herein is of great utility in such a system. It can also be appreciated that an object, such as 110c, may be hosted on another computing device 110a, 110b, 110e, etc. or 10a, 10b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks.

Currently, many of the networks are coupled to the Internet, which provides the infrastructure for widely distributed computing and encompasses many different networks. In home networking environments, there are at least four disparate network transport media that may each support a unique protocol, such as Power line, data (both wireless and wired), voice (e-g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e-g., cell phones) and may be distributed within the home using Cat 3 wiring. Entertainment media, or other graphical data, may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to program objects which make use of intermediate results of intermediate targets in accordance with the present invention.

The Internet commonly refers to the collection of networks and gateways that utilize the TCP/IP suite of protocols, which are well-known in the art of computer networking. TCP/IP is an acronym for "Transport Control Protocol/interface Program."

The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction. Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 3A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium.

In particular, the client and server may be coupled to one another via TCP/IP connections for high-capacity communication. Thus, FIG. 3A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process graphical object(s).

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP.

Servers 10a, 10b, etc. may also serve as clients 110a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files may be stored or to which portion(s) of files may be downloaded or migrated.

Any computer 10a, 10b, 110a, 110b, 110e, etc. may be responsible for the maintenance and updating of a database 20 or other storage element in accordance with the present invention, such as a database or memory 20 for storing graphics object(s) or intermediate graphics object(s) or data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 3B:
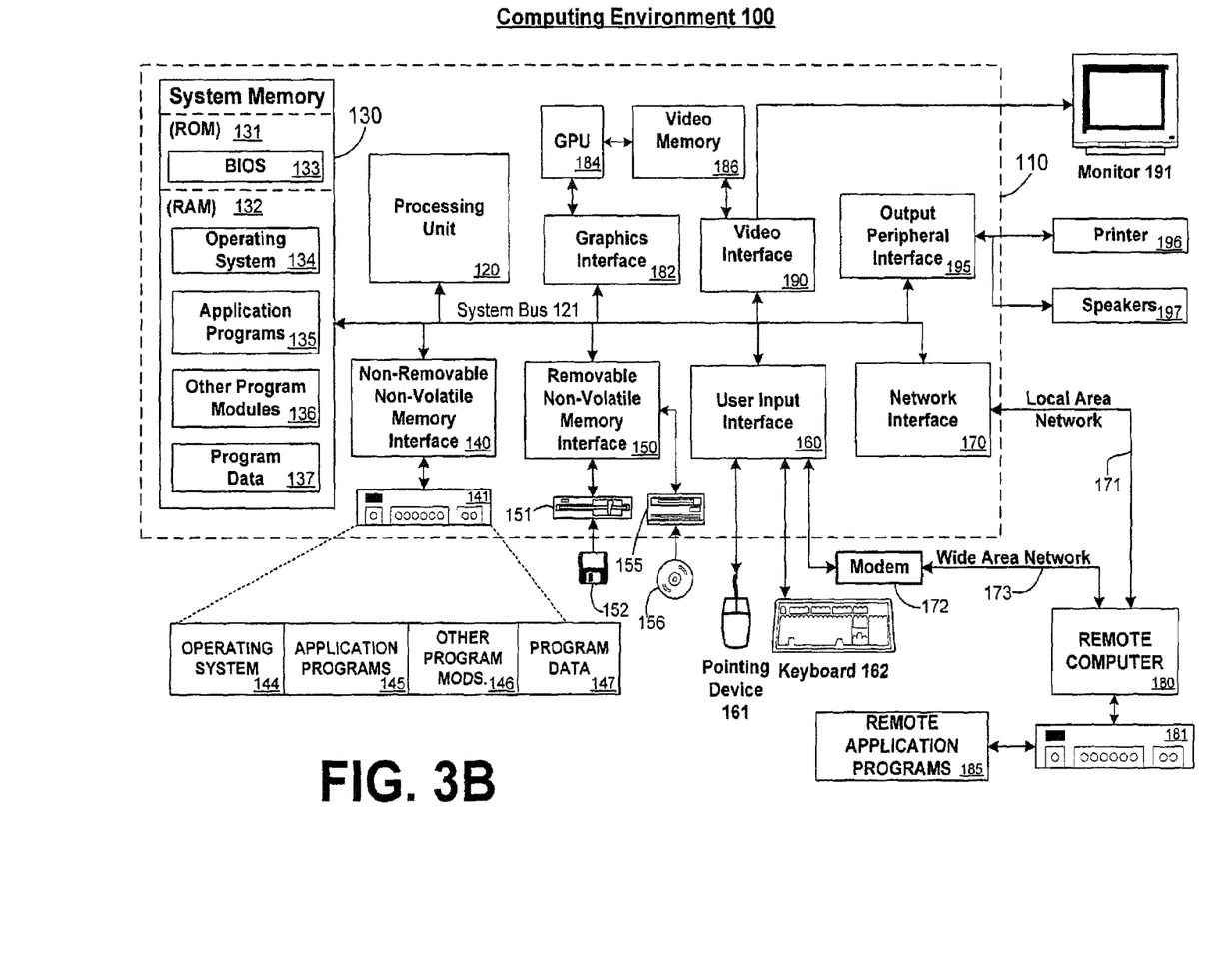
FIG. 3B is a block diagram representing an exemplary non-limiting computing device in which the present invention may be implemented.

FIG. 3B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction.

Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved is a desirable, or suitable, environment for operation of the graphics pipeline techniques of the invention.

Although not required, the invention can be implemented via an operating system, for use by a developer of services for a device or object, and/or included within application software that operates in connection with intermediate targets of the invention. The invention also implicates the design of vertex shaders and pixel shaders as well in order to interact with the intermediate targets of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes. FIG. 3B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 3B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data By way of example, and not limitation, communication media includes wired media such as a wired network or direct-wired connection, and wireless media such as acoustic, RF, infrared and other wireless media.

Combinations of any of the above should also be included within the scope of computer readable media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3B illustrates operating system 134, application programs 135, other program modules 136, and program data 137.

The computer 110 may also include other removable/non-removable, volatile/nonvolatile computer storage media. By way of example only, FIG. 3B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3B provide storage of computer readable instructions, data structures, program modules and other data for the computer 110. In FIG. 3B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the intermediate targets of the invention may be implemented. GPUs 184, however, are but one example of a coprocessor and thus a variety of coprocessing devices may be included in computer 110, and may include a variety of procedural shaders, such as pixel and vertex shaders.

A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195. The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3B. The logical connections depicted in FIG. 3B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portion's thereof, may be stored in the remote memory storage device.

By way of example, and not limitation, FIG. 3B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office.NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

While exemplary embodiments herein are described in connection with software residing on a computing device, one or more portions of the invention may also be implemented via an operating system, application programming interface (MI) or a "middle man" object between a coprocessor and requesting object, such that controllable texture sampling services may be performed by, supported in or accessed via all of .NET'S languages and services, and in other distributed computing frameworks as well. Additionally, another aspect to the invention is the intermediate targets themselves residing in video memory, as well as the graphics architecture that permits procedural shaders to receive programs from the Ml, and translate them to various intermediate targets.

Multiple Intermediate Target Circulation

The systems and methods of the invention enable the creation of a high level language to abstract and simplify use of the programmable capabilities in connection with the evolution of a generally programmable graphics pipeline. The invention thus enables a platform that allows a much broader range of graphics techniques to be expressed by the developer, but carried out at very high performance levels by the graphics hardware.

Figure 4:
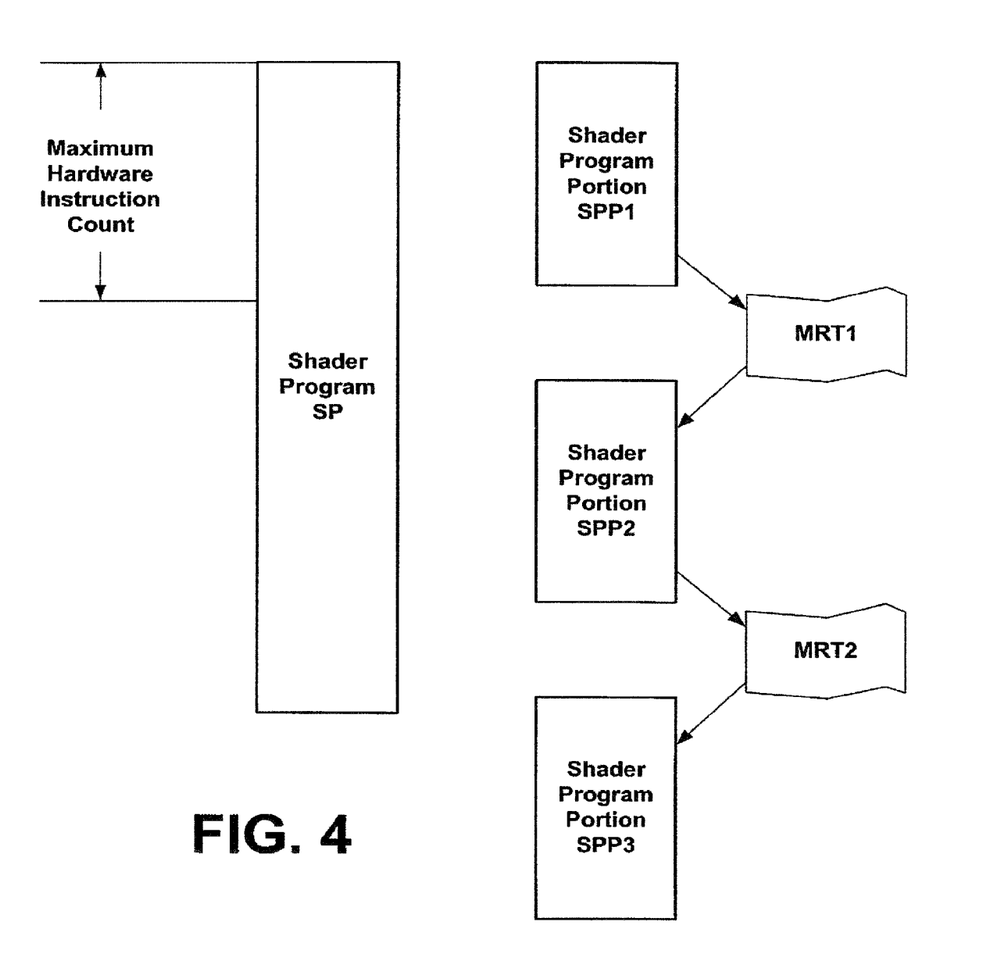
FIG. 4 illustrates exemplary use of the intermediate memory targets of the invention to circumvent a hardware instruction count limit.

Graphics platforms that do not have recirculation of intermediate targets in accordance with the invention are limited in the size and complexity of programs that operate on a per pixel and per vertex level from a performance perspective, in that additional passes upon the data are required to achieve a similar result. For example, certain programs that implement lighting effects, or like transformations, are limited to non-real time graphics without the present invention because of the complexity and/or length of the programs involved. As illustrated by FIG. 4, a relatively complex shader program SP exceeds the maximum instruction limit for the hardware, e.g., pixel shader, involved and accordingly, the developer without the help of the invention is left to implement the transformation by the host processor, which may not be fast enough for real-time demands. Through the use of intermediate targets MRT1 and MRT2, which may be variably sized in accordance with the invention, the developer can in effect break the program SP into portions SPP1, SPP2 and SPP3, none of which individually exceed the instruction limit for the hardware, but which collectively perform the functionality of SP by outputting and re-using intermediate results. For instance, SPP1 outputs intermediate results to intermediate target MRT1, which serves as an input to program portion SPP2, which then outputs intermediate results to intermediate target MRT2, which in turn serves as an input to program portion SPP3, which then outputs the desired transformed data. The invention can thus be used to create virtually unlimited length programs that allow non-real time rendering using hardware acceleration. The availability of unlimited hardware accelerated recirculation for non-real time rendering applications in accordance with the invention thus increases the speed and performance of a graphics platform.

Moreover, the ability to recirculate the data in the MRTs to any program as an input any number of times means that iterative operations, and re-use of intermediate data without recalculation can be achieved by any program. Still further, the format of the data in the intermediate targets is set by the developer such that MRT1 may include Red, Green, Blue color data, but MRT2 may include data wholly irrelevant to color, e.g., the data may have to do with a complex function of position, or weight. Also, as mentioned above, the size of the buffers, i.e., the amount of data stored in the intermediate targets, can be variably set for a varying amount of resolution for the graphics data.

As used herein, multiple recirculation targets (MRTs) of the invention are textures that are used as buffers. The buffers can be used as inputs to and outputs from a per pixel program commonly referred to as a "pixel shader." A single pixel shader program may simultaneously input from any number of these MRTs in the form of textures while outputting to any number of other MRTs that appear as render targets. The number of these distinct buffers is limited only by the hardware, and the size of video memory, and thus these buffers can be quite numerous. Exemplary components of the invention include: (1) pixel shader program(s) that have the ability to sample textures and output to multiple render targets in addition to any final optional frame buffer output and (2) recirculation buffer(s) that can be bound to the pixel shader program(s) as render targets for output or textures for input.

Non-Limiting Embodiments

What follows are non-limiting software implementations of the invention that utilize the above components of the invention. In this regard, the invention expresses MRTs in at least two forms in order to accommodate variations in hardware. The implementations include a form described as an MET form and a form described as an MRT form. The MET form is a more simple form. In the MET case, the intermediate four component outputs generally associated with a color element are written to a single surface in an interleaved fashion. In the MRT case, the individual color elements may be bound to individual surfaces separately. These surfaces may vary in format for each color element in whatever manner is optimal for the technique being expressed by the pixel shader program.

Non-Limiting MET API

For purposes of the MET API, traditional textures are considered to be single element textures, enabling applications to write to multiple elements of a texture simultaneously from the pixel shader, so that in the next rendering pass, an application can use one or more of those elements as a single element texture, i.e., as inputs to the pixel shader. These additional elements can be thought of as temporary store for intermediate results that will be used in a later pass by the application.

Figure 5:
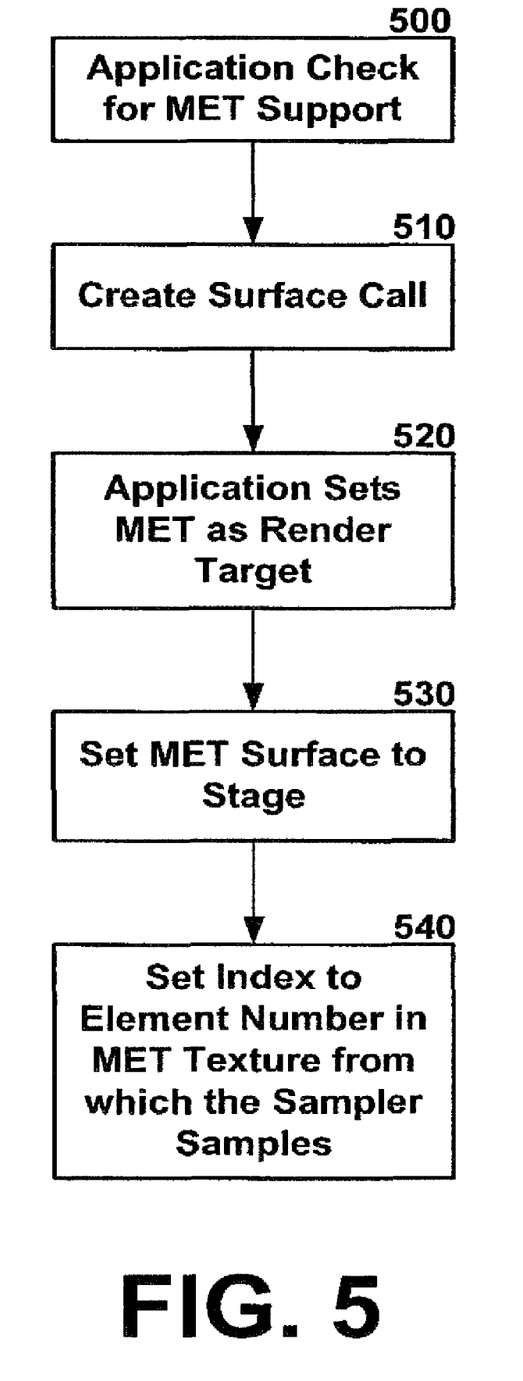
FIG. 5 is an exemplary flow diagram illustrating the use of an API in accordance with the invention.

Exemplary non-limiting usage of METs is illustrated by the pseudocode flowchart of FIG. 5. At 500, an application discovers support for the intermediate targets by checking for the availability of MET formats. At 510, the application creates the MET surfaces by a call to a CreateSurface function. At 520, the application sets an MET as a RenderTarget via a SetRenderTarget function call. The pixel shader 230 outputs to the surfaces using a move instruction. At 530, a SetTexture function is called to set an MET surface to a particular stage. Like other textures, the same surface can be set to multiple stages at once. At 540, a SetSamplerState function is called to set a D3DSAMP_ELEMENTINDEX variable to the appropriate element number in the MET texture from which the sampler samples, whereby the default value for the sampler state is 0, which means non-MET textures will work. A ValidateDevice function call reports the setting of this state to an inappropriate number, e.g., if the MET is only 2 elements wide but the sampler is asked to sample from the 4th element. The following is a non-limiting API that supports the MET feature. There are surface formats like the ones shown below that express the interleaved-ness of the format.

```
// interleaved surface formats that the card can support
D3DFMT_MULTI2_ARGB8 = MAKEFOURCC('M','E','T', '1'),
D3DFMT_MULTI4_ARGB8 = MAKEFOURCC('M','E','T', '2'),
// Sampler state to indicate which element to pick up.
D3DSAMP_ELEMENTINDEX
// Renderstates
// D3DRS_COLORWRITEENABLE applies to render target (or element) zero.
D3DRS_COLORWRITEENABLE1
D3DRS_COLORWRITEENABLE2
D3DRS_COLORWRITEENABLE3
// Optional device specific caps
D3DPMISCCAPS_INDEPENDENTWRITEMASKS // True if device can support independent write masks
```

Non-Limiting Multiple Render Targets (MRT) API

Many implementations support a less restrictive form of MET, termed herein MRT. One such relaxation is the ability to have multiple render targets that can be created independently. These render can have different formats. Currently, some 3-D graphics APIs support a single Render Target that is settable via the pre-existing SetRenderTarget API. In accordance with the invention, this API entry point has been extended to allow multiple render targets to be simultaneously present in the device. A new cap expresses this ability.

The following oCn registers below represent exemplary different elements of a MET texture: (a) oC0: Color 0 (element 0), (b) oC1: Color 1 (element 1), (c) oC2: Color 2 (element 2), (d) oC3: Color 3 (element 3) and (e) oDepth: New depth value for depth test against depth-stencil buffer. oCx registers can be written to using a move instruction.

Exemplary non-limiting pseudocode for an MRT API follows:

```
IDirect3DDevice9::SetRenderTarget( DWORD RenderTargetIndex,
IDirect3DSurface9* pRenderTarget);
IDirect3DDevice9: :GetRenderTarget( DWORD RenderTargetIndex,
IDirect3DSurface9** ppRenderTarget);
// Device specific Cap
D3DCAPS9.NumSimultaneousRTs // 1 for all except those that can
support this feature. Never 0.
// Move instruction
Move: mov
Token Format: 1 opcode token - D3DSIO-MOV (instr. length field
set to: 2)
1 destination token
1 source token
Instruction: mov[_sat] dst[.mask], [-]src0[.swizzle]
```

The following includes an exemplary pseudocode description for a component-wise move:

```
Operation: dst = src0
dst can be r#/oC#/oDepth
src0 can be r#/c#/v#/t#
```

Exemplary Use of the Intermediate Targets

Figure 6:
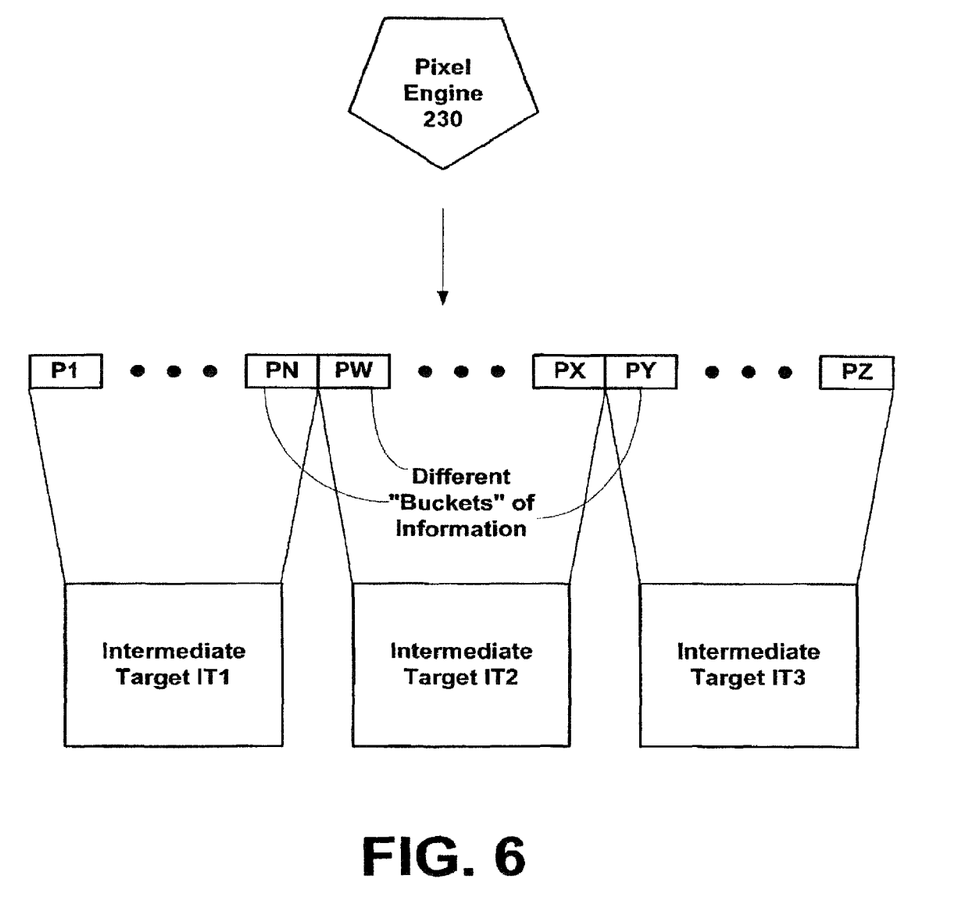
FIG. 6 is a block diagram illustrating exemplary aspects of the intermediate memory targets of the invention.

FIG. 6 illustrates that with the intermediate targets of the invention, a plurality of intermediate targets can be created as outputs from the pixel engine, with varying buckets of information, unlike the prior art pixel engine techniques. Moreover, the data in the intermediate targets can be preserved indefinitely and accordingly, may be reused later. For instance, pixels 30 P1 to PN could store R, G, and B values of pixels and be placed in intermediate target IT1. Pixels PW to PX could store lighting values and be placed in intermediate target IT2 and pixels PY to PZ could store some other intermediate result and be placed in intermediate target IT3. The data in each of the intermediate targets IT1, IT2 and IT3 can be re-used by the same or different programs, or portions of programs, and thus a variety of complex shading effects can be 35 achieved. The hardware, e.g., graphics chip including a vertex shader and a pixel shader, outputs to or inputs from the intermediate target(s) in accordance with the developer's specification via the APIs.

Figure 7:
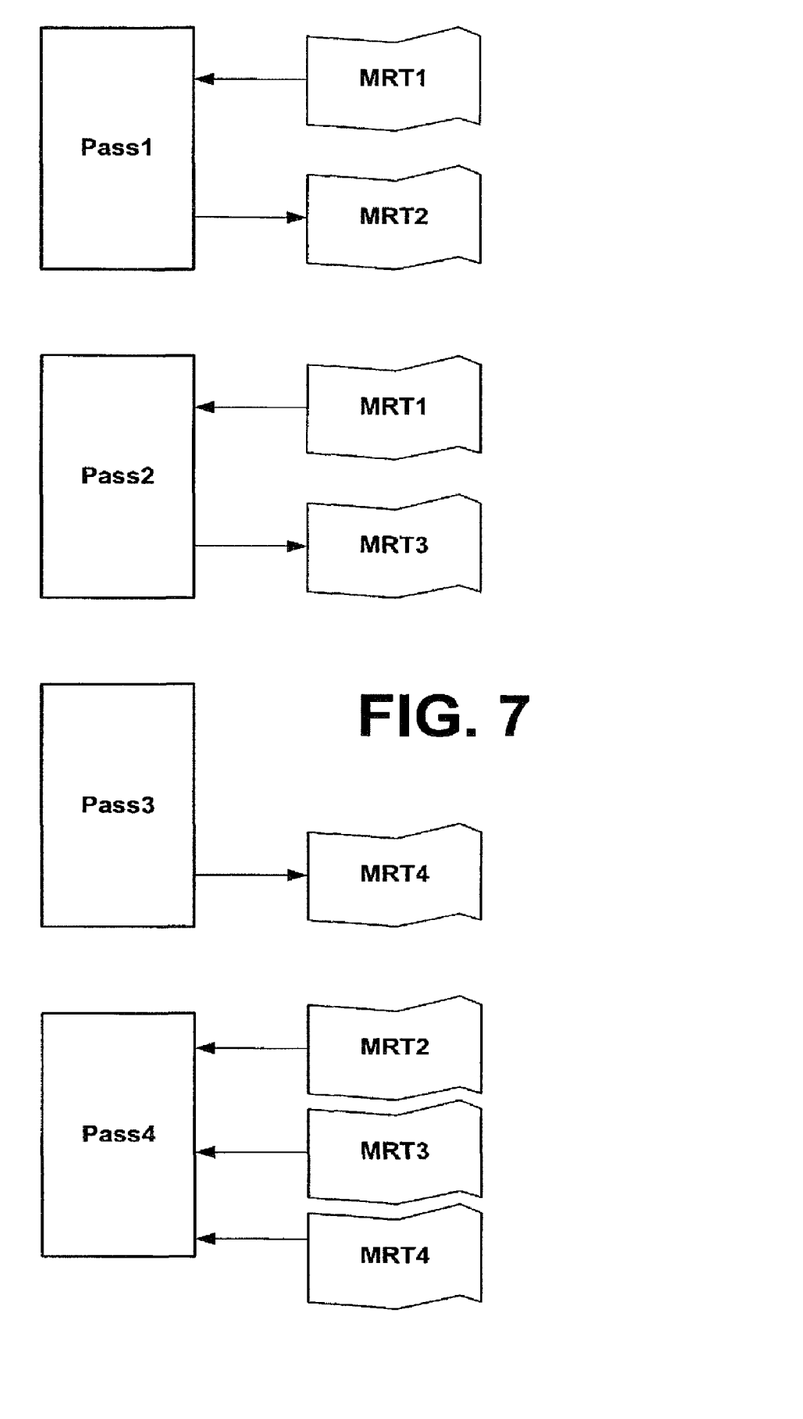
FIG. 7 illustrates exemplary use of the intermediate memory targets to achieve complex functionality with several program passes by hardware in accordance with the invention.

For an example of a more complex operation that can be achieved in accordance with the invention, FIG. 7 illustrates an intermediate target MRT1 that has persisted for some time, and is requested to be an input to a first program Pass1, which takes MRT1 as an input and outputs intermediate target MRT2. Subsequently, or previously, program Pass2 takes MRT1 as an input and outputs intermediate target MRT3. Additionally, program Pass3 outputs intermediate target MRT4 without input. Lastly, program Pass4 performs some operation taking MRT2, MRT3 and MRT4 as inputs to the hardware. Several MRTs are used to allow several pixel programs to share intermediate data in a more complex fashion. This demonstrates that the life of the MRT is totally up to the developer's control.

In other words, the program begins with Pass1. Data is read from MRT1 (which was created some time early by some other program). Pass1 executes some programmatic algorithm and produces MRT2. Pass2 again uses MRT1 and performs a different algorithm to produce MRT3. Pass3 algorithmically generates MRT4 with no input. Pass 4 (final pass) combines data from MRT2, MRT3 and MRT4 to finally emit the correct color data to the frame buffer, a much more complicated shading effect than ever could be achieved with graphics hardware with the limitations of the prior art.

There are multiple ways of implementing the present invention. One way is to provide an implementation whereby the coprocessor(s), e.g., GPU(s), are pre-fabricated to perform the functionality of the invention, and receive commands suited to the multiple intermediate targets as described herein. Another implementation of the invention includes an appropriate API, tool kit, driver code, operating system, standalone or downloadable software object, etc. which enables applications and services to use the intermediate targets to achieve more complex functionality. The invention contemplates the use of the invention from the standpoint of an API (or other software object), the graphics chip and the video memory. Thus, various implementations of the invention described herein have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to program procedural shaders in more than trivial ways. Thus, the techniques for providing improved programmability of procedural shaders in accordance with the present invention may be applied to a variety of applications and devices. For instance, the algorithm(s) and hardware implementations of the invention may be applied to the operating system of a computing device, provided as a separate object on the device, as part of another object, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent functionality achieved by the API of the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CDROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the intermediate target services of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software. While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network.

Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

We claim:

1. A component of a graphics subsystem of a computing system including a graphics processing unit (GPU) configured to perform acts comprising:

supporting operation of a graphics program that processes three dimensional graphics with a plurality of surfaces, wherein color elements of the plurality of surfaces are bound to individual surfaces separately;

receiving an instruction from the graphics program that exceeds a maximum graphics instruction limit;

allocating intermediate memory buffers for the three dimensional graphics;

separating the instruction into a first set of program instructions to perform a first function which does not exceed the maximum graphics hardware instruction count and which uses the intermediate memory buffers, the first set of program instructions configured to cause the GPU to perform operations of a portion of the graphics program;

separating the instruction into a second set of program instructions to perform a second function which does not exceed the maximum graphics hardware instruction count and which uses the intermediate memory buffers, the second set of program instructions configured to cause the GPU to perform operations of another portion of the graphics program different from the first set of program instructions; and separating the instruction into a third set of program instructions to perform a third function which does not exceed the maximum graphics hardware instruction count and which uses the intermediate memory buffers, the third set of program instructions configured to cause the GPU to perform performing operations of another portion of the graphics program different from the first set of program instructions and different from the second set of program instructions.

2. The component of a graphics subsystem as recited in claim 1, wherein the component includes a procedural shader.

3. The component of a graphics subsystem as recited in claim 2, wherein a resolution of each intermediate memory buffer is variably set and wherein each color element is written to each surface in an interleaved fashion.

4. A method of providing target memory buffers for three dimensional graphics in a computing system, the computing system including a graphics processing unit (GPU), and a central processing unit (CPU), the method comprising:

operating a graphics program that includes a procedural shader;

separating the graphics program into sets of program instructions when the graphics program exceeds a maximum graphics hardware instruction count, wherein each set of program instructions does not exceed the maximum graphics hardware instruction count, and wherein the three dimensional graphics have a plurality of surfaces, and wherein color elements of the plurality of surfaces are bound to individual surfaces separately;

transmitting a set of the program instructions to the GPU;

allocating, by the set of the program instructions sent to the GPU, target memory buffers to hold data generated by executing the set of the program instructions;

writing, by the set of program instructions, to a plurality of the target memory buffers; and persisting the target memory buffers for use by other sets of program instructions.

5. The method according to claim 4, wherein a resolution of each target memory buffer is variably set, and wherein the writing to the plurality of the target memory buffers is done simultaneously.

6. The method according to claim 4, wherein the graphics program operates on a per vertex basis in real time.

7. The method according to claim 4, wherein the procedural shader is one of a vertex shader and a pixel shader, wherein the set of program instructions sent to the GPU outputs data to multiple elements of a texture for each of the plurality of surfaces simultaneously, and wherein the set of program instructions uses a plurality of the multiple elements as a single element texture.

8. The method according to claim 4, wherein data in a first target memory buffer represents different pixel data than data in a second target memory buffer.

9. The method according to claim 4, wherein the target memory buffers comprise a portion of video memory.

10. The method according to claim 4, wherein the set of program instructions outputs data to multiple elements of a texture simultaneously.

11. The method as in claim 4, wherein the target memory buffers are created through a call, by the set of program instructions, to an application programming interface (API).

12. The method as in claim 4, wherein the set of program instructions sets each surface to a particular stage.

13. The method as in claim 4, wherein each of four components of a color element for each single surface is written in an interleaved fashion.

* * * * *